United States Patent
Luo et al.

(10) Patent No.: US 10,562,498 B2
(45) Date of Patent: Feb. 18, 2020

(54) ATV WINDSHIELD AND WIPER MOUNTING

(71) Applicant: Zhejiang CFMOTO Power Co., Ltd., Hangzhou, Zhejiang (CN)

(72) Inventors: Longping Luo, Hangzhou (CN); Wenxu Xie, Hangzhou (CN); Yunfeng Shen, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 0 days.

(21) Appl. No.: 16/049,126

(22) Filed: Jul. 30, 2018

(65) Prior Publication Data

US 2019/0031148 A1    Jan. 31, 2019

(30) Foreign Application Priority Data

Jul. 31, 2017    (CN) .......................... 2017 1 0637441

(51) Int. Cl.
*B60S 1/04* (2006.01)
*B60J 1/00* (2006.01)
*B60J 1/04* (2006.01)

(52) U.S. Cl.
CPC ............ *B60S 1/0433* (2013.01); *B60J 1/007* (2013.01); *B60J 1/04* (2013.01); *B60S 1/0458* (2013.01); *B60S 1/0466* (2013.01)

(58) Field of Classification Search
CPC .... B60J 1/002; B60J 1/007; B60J 1/04; B60S 1/0433; B60S 1/0458
USPC ........................................................ 296/90
See application file for complete search history.

(56) References Cited

U.S. PATENT DOCUMENTS

| | | | | |
|---|---|---|---|---|
| 4,116,483 A | * | 9/1978 | Kramer ................. | B60J 1/04 296/190.1 |
| 5,410,774 A | * | 5/1995 | Adams .................. | B60S 1/0497 15/230.1 |
| 6,364,570 B1 | * | 4/2002 | Egner-Walter ............ | B60S 1/04 15/250.29 |
| 9,975,523 B1 | * | 5/2018 | Canela .................. | B60S 1/0497 |
| 9,994,088 B2 | | 6/2018 | Roy | |
| 10,336,389 B2 | * | 7/2019 | Di Tanna | |
| 2016/0355073 A1 | * | 12/2016 | Bender ................. | B60S 1/0441 |
| 2017/0282865 A1 | * | 10/2017 | Roy ......................... | B60S 1/50 |

FOREIGN PATENT DOCUMENTS

| | | | | | |
|---|---|---|---|---|---|
| EP | 1375270 A2 | * | 1/2004 | ............ | B60S 1/0438 |
| FR | 2855473 A1 | * | 12/2004 | ............ | B60S 1/0447 |
| FR | 2894221 A3 | * | 6/2007 | ........... | B60Q 1/0017 |
| GB | 396260 A | * | 8/1933 | ................ | B60J 1/04 |
| GB | 2529832 A | * | 3/2016 | ................ | B60S 1/28 |

* cited by examiner

*Primary Examiner* — Hilary L Gutman
(74) *Attorney, Agent, or Firm* — Shewchuk IP Services, LLC; Jeffrey D. Shewchuk

(57) ABSTRACT

A windshield wiper mounting plate supports a wiper relative to a frame of an all-terrain vehicle. The windshield is hinged to the frame, and the windshield wiper mounting plate is separately hinged to the frame. The windshield can be pivoted relative to the frame, simultaneously pivoting the windshield wiper mounting plate and attached wiper. The windshield is received in a windshield mounting groove of the windshield wiper mounting plate. The windshield can be removed from the frame by sliding the windshield out of the windshield mounting groove and while leaving the windshield wiper mounting structure attached to the frame of the all-terrain vehicle.

8 Claims, 3 Drawing Sheets

ATV WINDSHIELD AND WIPER MOUNTING

CROSS-REFERENCE TO RELATED U.S. APPLICATION(S)

None.

FIELD OF THE INVENTION

The invention relates to the technical field of the all-terrain vehicle, and particularly to windshields and windshield wipers used on all-terrain vehicles.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement. All-terrain vehicles may also be referred to as "beach vehicles", or "four-wheel motorcycles".

Some all terrain vehicles include a cab with a front windshield. It may be desired to remove the front windshield from the vehicle, either when the windshield becomes damaged and needs to be replaced with a new one, or to allow more open air riding. A windshield wiper may be installed on the front windshield using a mounting hole. The presence of the wiper installed on the windshield makes it more difficult to remove the windshield from the vehicle. When the windshield is removed from the vehicle, if the wiper is also removed from the front windshield, it also becomes easy to lose parts of the wiper. Better solutions are needed.

BRIEF SUMMARY OF THE INVENTION

In view of this, the present invention provides a type of wiper mounting structure which reduces the difficulty of removing the windshield of the all-terrain vehicle from the cab. The all-terrain vehicle includes a frame mounted on the cab of the all-terrain vehicle, with the windshield connected to the frame by a hinge or more preferably two hinges. A wiper mounting plate is used for supporting the windshield wiper, which is separately connected to the frame by a hinge, preferably arranged toward the outside of the cab with a flipped lap edge lapped on the frame. The surface of the wiper mounting plate provides a wiper mounting base used for installing the wiper.

Preferably the circumferential edge of the wiper mounting plate has a windshield mounting groove which is arranged inward in its width direction and coupled with the windshield, with the windshield installed into the windshield mounting groove. Preferably the width of the wiper mounting plate gradually increases from the distal end to the proximal end.

Preferably the hinged connection between the windshield and the frame is located at the top of the windshield. Preferably, the hinged end of the wiper mounting plate has a rain retaining ear extended to the inner side of the frame, and the outer end face of the rain retaining ear makes contact with the inner wall of the frame.

BRIEF DESCRIPTION OF THE DRAWINGS

In order to describe the technical scheme more clearly in the existing technology or the embodiment of the present invention, the drawings required for the implementation of the existing technology or the embodiment of the present invention are briefly introduced in the following, obviously, the drawings below are some embodiments of the present invention, for the ordinary technical personnel in the art, you can also get other drawings according to these drawings at the premise of without giving creative labor.

Figure 1:
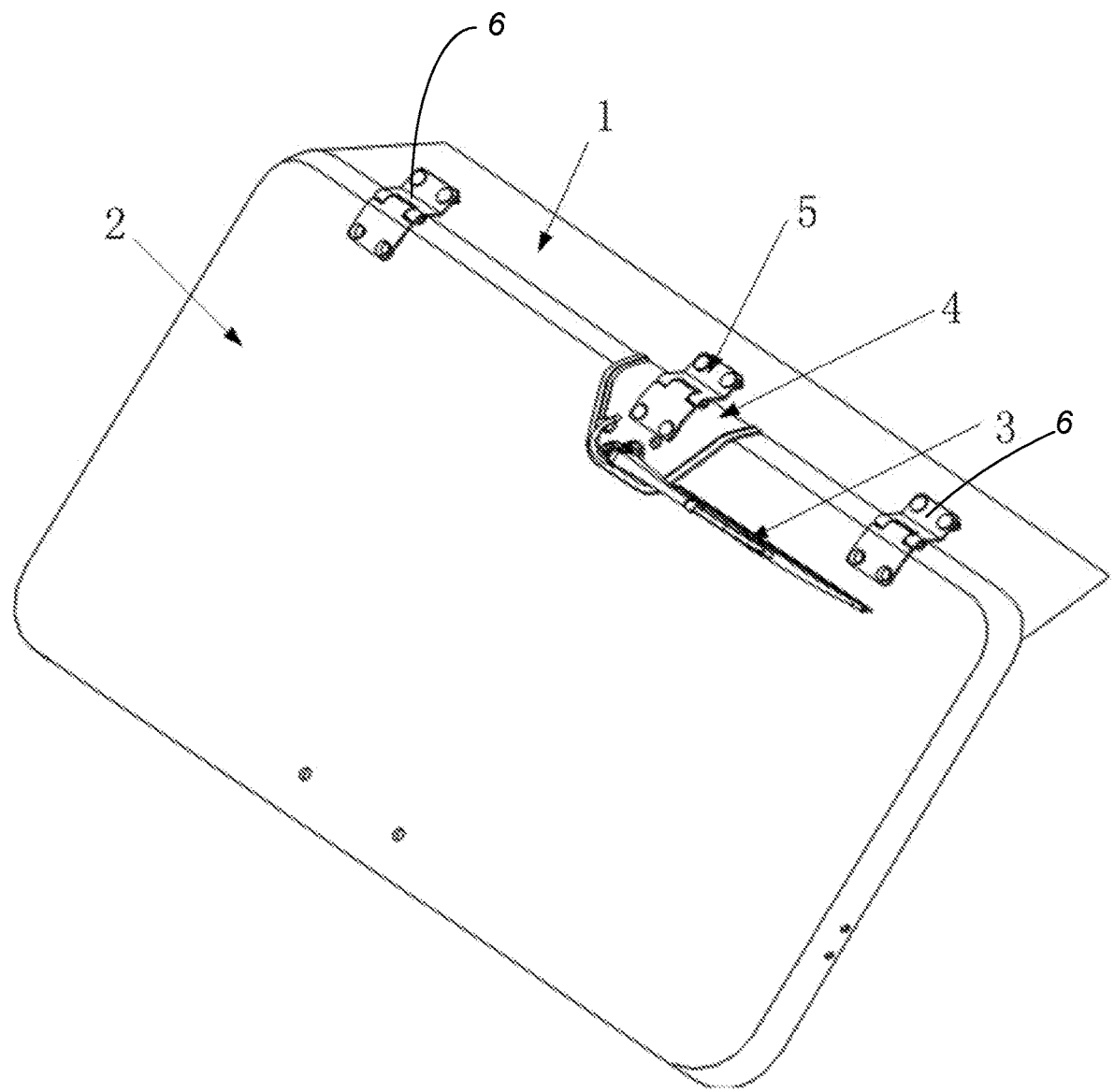
FIG. 1 is a perspective view showing the wiper mounting structure of the all-terrain vehicle provided by the present invention.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The invention provides a type of wiper mounting structure for an all-terrain vehicle. A windshield frame 1 is arranged on the cab of the all-terrain vehicle. For example, the frame 1 may be part of a roll over protection system as known for all terrain vehicles. A windshield 2 is connected to the front of the upper end of the frame 1 by two hinges 6. The hinged connection allows the windshield 2 to be opened on the frame 1 when desired, with the user pivoting the bottom of the windshield 2 upward. The hinges 6 include removeable fasteners allowing the windshield 2 to be removed when needed.

A wiper mounting plate 4 supports a wiper 3 used for cleaning the windshield 2. The wiper mounting plate 4 is connected to the frame 1 by a hinge 5. The hinge 5 pivots about the same axis as the hinges 6, such that the wiper mounting plate 4 is synchronously driven open or closed during opening or closing of the windshield 2.

Figure 2:
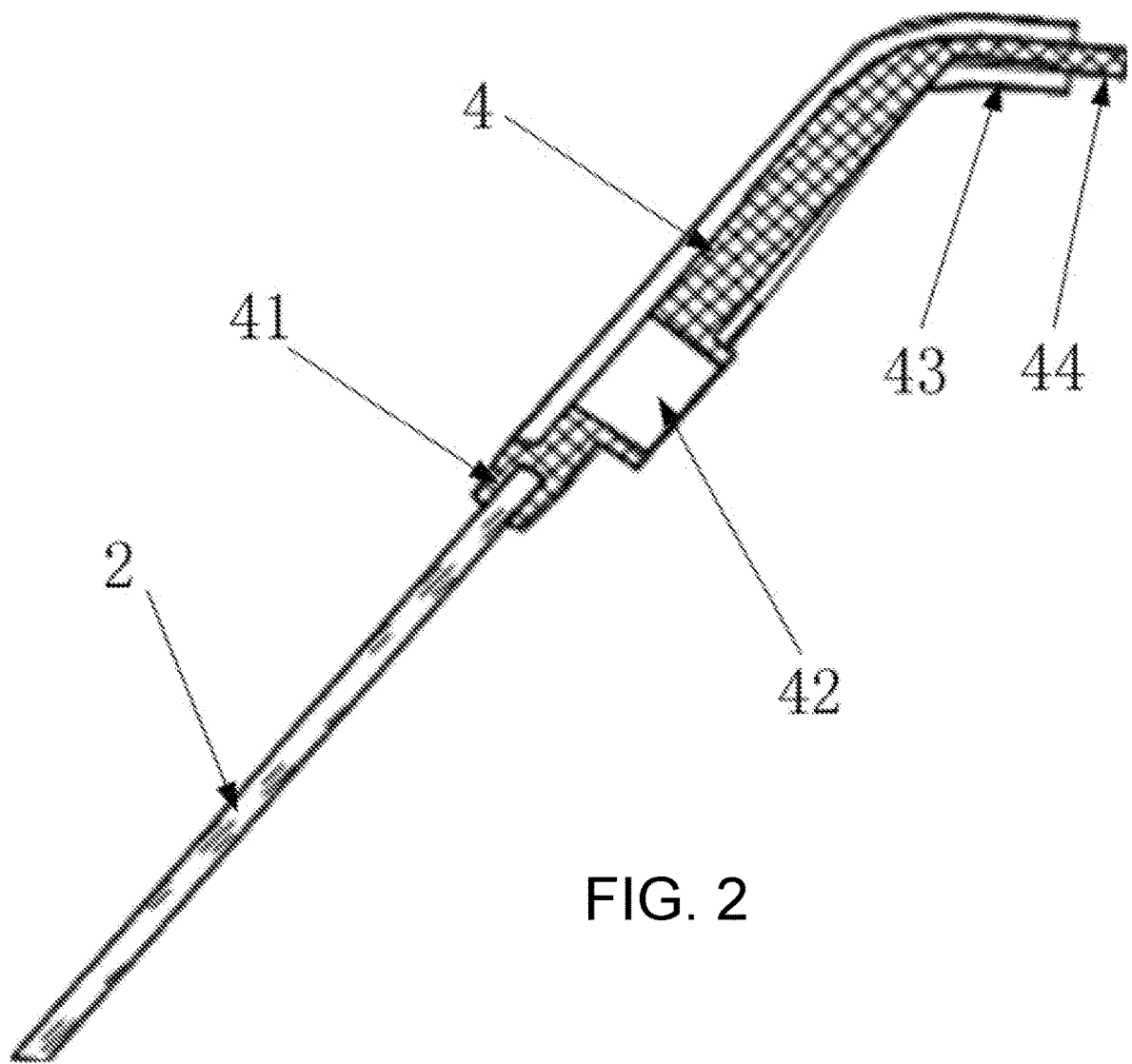
FIG. 2 is sectional view showing the structure that the windshield is connected to the wiper mounting plate in FIG. 1.
Figure 3:
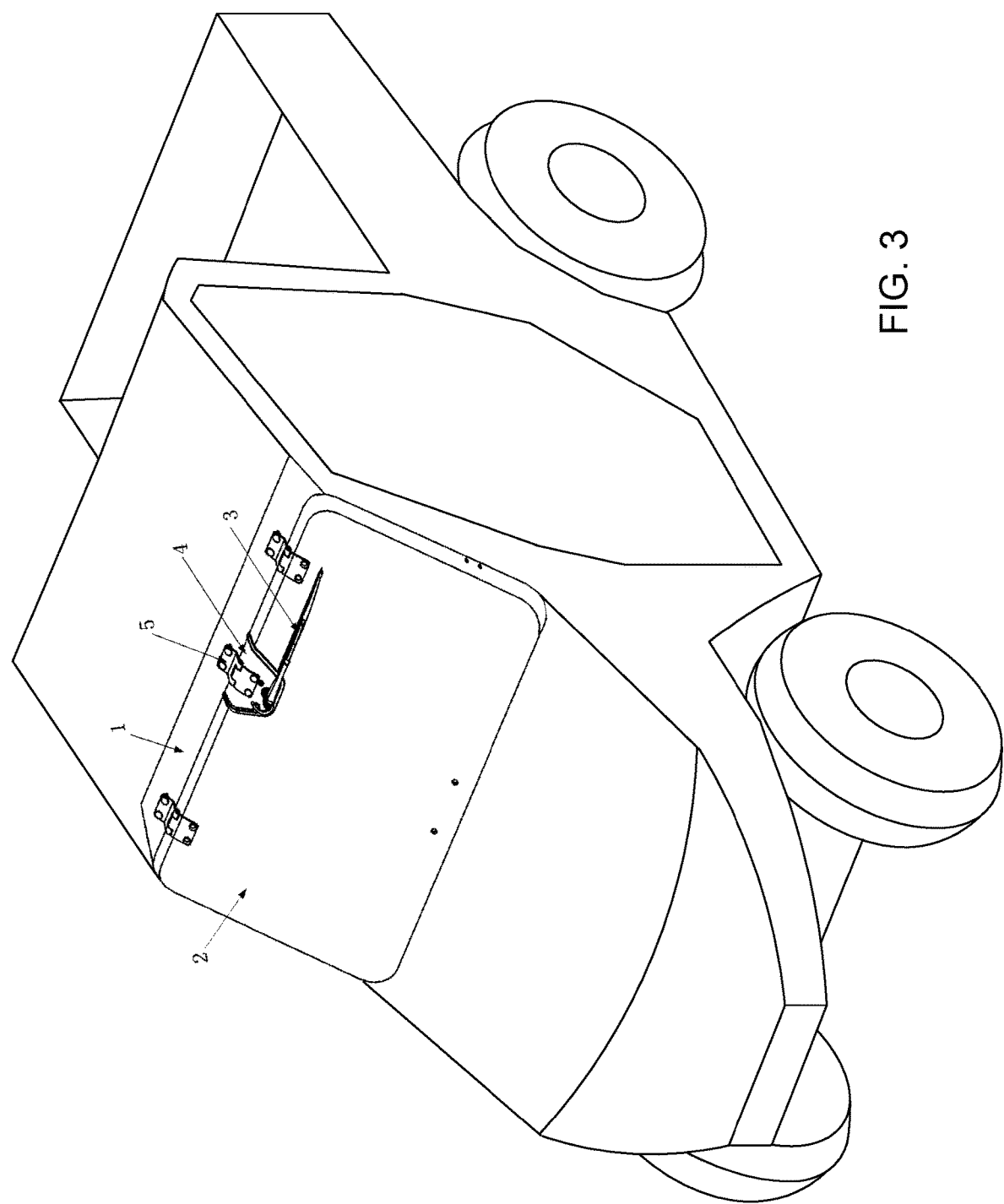
FIG. 3 shows the wiper mounting structure shown in FIG. 1 on a cab of an all terrain vehicle.

The mounting of windshield 2 should meet the sealing requirements of all-terrain vehicles and avoid leakage between the windshield 2 and the wiper mounting plate 4. As best shown in FIG. 2, the circumferential edge of the wiper mounting plate 4 is provided with a windshield mounting groove 41 which is arranged inward in its width direction and coupled with the windscreen 2 to achieve the seal effect. During installation of the windshield 2, the windshield 2 is slid generally upward and rearward, forcing the edge of the windshield 2 into the windshield mounting groove 41. After the windshield 2 has been slid into the windscreen mounting groove 41, the fasteners of the hinges 6 are installed to then fix the windshield 2 onto the frame 1.

When it is necessary or desired to remove the windshield 2 from the frame 1, the windshield 2 is only disassembled at the hinges 6. The windshield 2 is slidably withdrawn from the windshield mounting groove 41 on the wiper mounting plate 4 to finish windshield removal. It is not necessary to remove the wiper 3 when the windshield 2 is disassembled; the wiper 3 is still supported by the wiper mounting plate 4 and attached to the vehicle. Damaged or lost parts caused by the disassembling of the wiper 3 is avoided, and the difficulty of removing windshield 2 from the cab of the all-terrain vehicle is reduced.

As an alternative to the mounting groove 41, the mounting plate 4 can have a lap ear structure to lap on the end surface of the windshield 2, which similarly has the same effect of protecting from the rain.

In the preferred embodiment of the present invention, the width of the wiper mounting plate 4 gradually increases from the distal end to the proximal end, forming a trapezoid shape. As the windshield 2 is slid into the windshield mounting groove 41 on the wiper mounting plate 4, the edge of the windshield 2 gradually makes contact with the trapezoid shape of the wiper mounting plate 4, guiding the windshield 2 into position and ensuring tightness and compactness of the windshield 2 into the windshield mounting groove 41, improving mounting convenience of the windshield 2.

In the preferred embodiment of the present invention, the mounting hinge 5 is arranged outside the windshield 2, that is, outside the cab. During mounting of the hinge 5, the fastening screws or bolts are advanced inward toward the cab. The ends of the fastening screws or bolts are covered by the inner part of the frame 1 to avoid the possibility of rain water flowing into the cab along protruding screw threads. Further, the mounting hinge 5 is located outside the windshield. When the windshield 2 is opened, a large space between the windshield 2 and the frame 1 can be supported by the mounting hinges 5, 6, so the windshield 2 is easily opened or closed.

In the preferred embodiment of the present invention, a wiper mounting base or seat 42 is arranged on the surface of the wiper mounting plate 4 and used for mounting the wiper 3. The wiper mounting seat 42 provides the wiper 3 with rotating support.

In the preferred embodiment of the present invention, the proximal end of the wiper mounting plate 4 has a flipped lap edge 43 which extends inward in the direction of the thickness of the windshield 2. The flipped lap edge 43 is lapped on the frame 1. The proximal end of the wiper mounting plate 4 allows it to be bent along the surface of the windshield 2 and extended inward in the direction of the thickness of the windshield 2, then the flipped lap edge 43 is formed. The flipped lap edge 43 is lapped on the frame 1 to make the surfaces of the windshield 2 and the wiper mounting plate 4 to be protruded out of the windscreen mounting frame 1. The mounting hinge 5 is located on the surfaces of the frame 1 and the wiper mounting plate 4. When the windshield needs to be opened, the flipped lap edge 43 is misaligned with the frame 1 in the position lapped; the outer end of the flipped lap edge 43 and the frame are dodged each other to avoid the edges of frame 1, the wiper mounting plate 4 and the windshield 2 squeezing each other due to the misalignment of mounting structure of mounting hinge 5, so the safety of windshield 2 is ensured when it is opened.

In the preferred embodiment of the present invention, the proximal end of the wiper mounting plate 4 is provided with a rain retaining ear 44 extended to the inner side of the frame 1. The outer end face of the rain retaining ear 44 makes contact with the inner wall of the frame 1. In order to ensure the seal performance of protecting from the rain between the wiper mounting plate 4 and the frame 1, the rain retaining ear 44 is arranged on the hinged end of the wiper mounting plate 4 and extended to inside of the frame 1. When the windscreen is closed, the outer end face of the rain retaining ear 44 makes contact with the inner end face of the frame 1 to avoid the mounting interstice between the two of them and the leakage of rain water in that position.

Although the present invention has been described with reference to preferred embodiments, workers skilled in the art will recognize that changes may be made in form and detail without departing from the spirit and scope of the invention.

The invention claimed is:

1. A windshield wiper mounting structure for an all-terrain vehicle, comprising:
   a windshield wiper mounting plate adapted to rotationally support a windshield wiper, the windshield wiper mounting plate being adapted to seal to a windshield; and
   a hinge for pivotally supporting the windshield wiper mounting plate to a frame of the vehicle adjacent the windshield,
   wherein the windshield wiper mounting plate and supported windshield wiper can be pivoted with the windshield relative to the frame; and
   wherein the windshield is not fastened to the windshield wiper mounting plate, such that the windshield can be removed from the frame without removal of the windshield wiper mounting plate and supported windshield wiper from the vehicle.

2. The windshield wiper mounting structure of claim 1, wherein the windshield wiper mounting plate comprises a windshield mounting groove, enabling windshield removal by sliding the windshield out of the windshield mounting groove.

3. The windshield wiper mounting structure of claim 1, wherein the windshield wiper mounting plate is trapezoidal in shape, wider at its proximal end than at its distal end.

4. The windshield wiper mounting structure of claim 1, wherein the hinge is outside the windshield wiper mounting plate, for attachment to an outer side of the frame.

5. The windshield wiper mounting structure of claim 1, wherein the windshield wiper mounting plate comprises a wiper mounting base used for rotationally supporting the wiper.

6. The windshield wiper mounting structure of claim 1, wherein a proximal end of the windshield wiper mounting plate comprises a flipped lap edge extended inward in the direction of the thickness of the windshield, and wherein the flipped lap edge is lapped on an inside of the frame.

7. The windshield wiper mounting structure of claim 6, wherein the proximal end of the windshield wiper mounting plate comprises a rain retaining ear.

8. An all terrain vehicle comprising:
   a cab with a frame;
   a windshield pivotally attached to the frame with at least two hinges;
   a windshield wiper mounting plate pivotally attached to the frame by a hinge for coaxial pivoting with the windshield, the windshield wiper mounting plate rotationally supporting a windshield wiper, the windshield wiper mounting plate being adapted to seal to the windshield;
   wherein the windshield wiper mounting plate and supported windshield wiper can be pivoted with the windshield relative to the frame; and
   wherein the windshield is not fastened to the windshield wiper mounting plate, such that the windshield can be removed from the frame without removal of the windshield wiper mounting plate and supported windshield wiper from the vehicle.

* * * * *